United States Patent
Duffy et al.

(12)

(10) Patent No.: US 6,672,200 B2
(45) Date of Patent: Jan. 6, 2004

(54) SYSTEM FOR MONITORING AND CONTROLLING THE OPERATION OF A SINGLE SERVE BEVERAGE BREWER

(75) Inventors: Brendan J. Duffy, Georgetown, MA (US); Karl T. Winkler, Bedford, MA (US); David G. Honan, Concord, MA (US); Jon Taylor, Groton, MA (US); Peter L. Stokes, Boston, MA (US)

(73) Assignee: Keurig, Inc., Wakefield, MA (US)

( * ) Notice: Subject to any disclaimer, the term of this patent is extended or adjusted under 35 U.S.C. 154(b) by 78 days.

(21) Appl. No.: 10/125,058

(22) Filed: Apr. 18, 2002

(65) Prior Publication Data

US 2002/0152895 A1 Oct. 24, 2002

Related U.S. Application Data

(60) Provisional application No. 60/284,454, filed on Apr. 18, 2001.

(51) Int. Cl.[7] ................................................. A47J 31/32
(52) U.S. Cl. .................... 99/283; 99/302 R; 99/305; 99/295; 222/394; 222/438; 222/146.5
(58) Field of Search ....................... 99/282, 283, 302 R, 99/305, 295, 307, 280; 222/394, 405, 146.5, 438, 636; 137/206, 209

(56) References Cited

U.S. PATENT DOCUMENTS 3,085,495 A    4/1963  Rosander .................... 99/283
5,111,740 A    5/1992  Klein ......................... 99/295
6,082,247 A    7/2000  Beaulicu .................... 99/302 R
6,142,063 A    11/2000 Beaulieu et al. ............. 99/283

Primary Examiner—Reginald L. Alexander
(74) Attorney, Agent, or Firm—Samuels, Gauthier & Stevens

(57) ABSTRACT

An automated beverage brewing system includes a liquid storage tank and a metering chamber. The metering chamber is at least partially submerged beneath a standing level of liquid in the storage tank. The chamber includes a sealable liquid inlet port communicating with the interior of the storage tank beneath the standing level of liquid. The chamber also includes a liquid outlet port and an aperture that receives compressed air, wherein the compressed air forces liquid from the liquid output port of the chamber for use in preparing a brewed beverage. A pump provides the compressed air and a controller monitors a pressure signal value indicative of the air pressure in the metering chamber. The controller commands the pump on to commence flow of liquid from the metering chamber. The controller then commands the pump off several seconds after detecting a drop in air pressure within the chamber. A baffle is affixed to the distal end of a shaft, which is moved between a first and second position. In the second position the baffle seals a section of the storage tank to form the metering chamber. The system may also include a second brew pump that allows a user to customize the quantity of liquid delivered from the brewing system for a stronger brewed beverage.

21 Claims, 12 Drawing Sheets

US 6,672,200 B2

SYSTEM FOR MONITORING AND CONTROLLING THE OPERATION OF A SINGLE SERVE BEVERAGE BREWER

PRIORITY INFORMATION

This application claims priority from a provisional application filed Apr. 18, 2001 designated Ser. No. 60/284,454 entitled "System for Monitoring and Controlling the Operation of a Single Serve Beverage Brewer". This application is incorporated herein by reference.

BACKGROUND OF THE INVENTION

This invention relates generally to beverage dispensing and brewing systems, and in particular with a system for monitoring and controlling a beverage brewer.

Many different coffee brewing systems have been designed. Most utilize a pump, such as a peristaltic pump, to transfer water from a reservoir through a conduit to a brewing chamber. The pump is turned on at the beginning of a brewing cycle and at the end of a specific time period the pump is turned off. Other brewing systems use an electrically controlled device to open a valve at the bottom of a reservoir. Through gravity the water travels through a conduit to a brewing chamber. Again at the end of a specific time period, the valve is closed. These prior brewing systems lack the capability of consistently dispensing equal volumes of liquid. The systems are dependent on the accuracy of the timers, the pressure of the liquid, etc.

Therefore, there is a need for an automated beverage brewing system for dispensing a predetermined volume of liquid from a storage tank.

SUMMARY OF THE INVENTION

Briefly, according to an aspect of the present invention, a beverage brewing system uses compressed air to drive liquid from a metering chamber for use in preparing a brewed beverage.

An automated beverage brewing system receives a cartridge containing a beverage extract and establishes a liquid flow path through the cartridge to provide a brewed beverage. The system includes a holder that holds and pierces the cartridge to provide a cartridge inlet and a cartridge outlet that together establish a flow path through the beverage extract to provide the brewed beverage. A storage tank comprising a supply of liquid and having a reduced diameter cup-shaped bottom is in fluid communication with the cartridge via a chamber outlet port. A portion of the storage tank is controllably sealed to form a metering chamber in cooperation with the reduced diameter cup-shaped bottom. A first pump provides compressed air along a flow line to the metering chamber to force liquid from the metering chamber and through the chamber outlet port. A sensor senses pressure in the flow line and provides a sensed pressure signal indicative thereof. A controller commands the first pump on, monitors the sensed pressure signal and turns the first pump off after detecting that the sensed pressure signal value has dropped below a threshold value indicating the predetermined volume of liquid has been delivered through the chamber outlet port.

The system may also include a second air pump that delivers a second flow of compressed air downstream of the metering chamber outlet port and upstream of the cartridge inlet in response to a brew interrupt signal received by the controller to drive the liquid downstream of the metering chamber outlet port to the cartridge. Advantageously, this allows a user to control the strength of their brewed beverage by using less water than the nominal amount dispensed by the brewer when the brew interrupt bottom is not depressed during a brew cycle.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
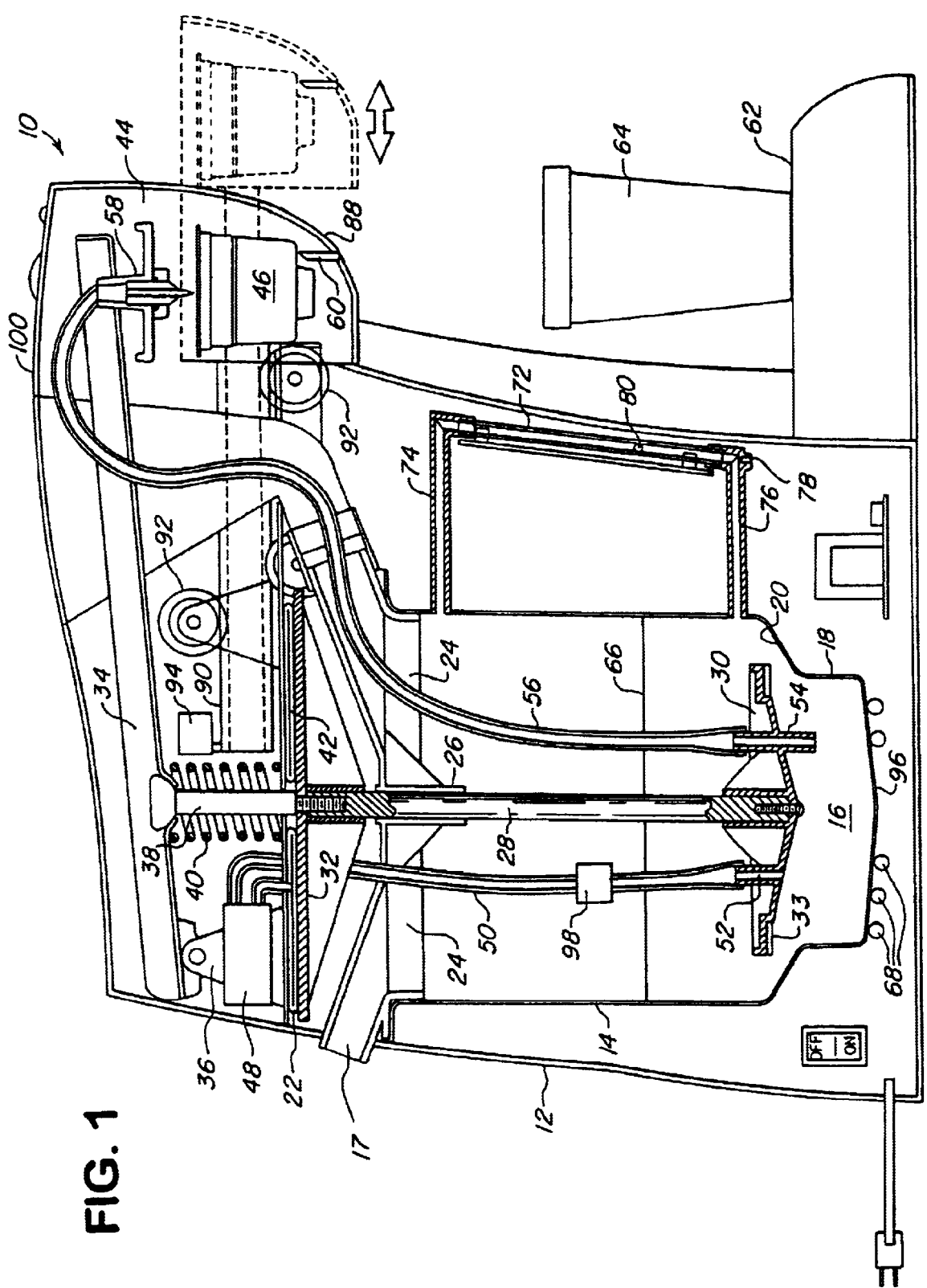
FIG. 1 is a vertical sectional view taken through a single serve beverage brewer.

The present invention is specially adapted for use in, although not limited in application to, a brewing system 10 illustrated in FIG. 1. Here, the dispensed liquid is water that is heated to a predetermined elevated temperature to brew beverages from extracts (e.g., coffee, tea, powders and concentrates) contained in disposable hermetically sealed cartridges.

With reference initially to FIG. 1, a single serve brewer 10 includes a housing 12 containing a liquid storage tank 14. The tank has a lower metering chamber 16 formed by a reduced diameter cup-shaped bottom 18 integrally joined to the larger diameter tank side wall at a circular sealing surface defining a seat 20. Water can be poured into the storage tank 14 via an inlet 17.

A fixed internal structure includes a horizontal platform 22 and struts 24 supporting a vertically disposed sleeve bearing 26 aligned centrally with respect to the tank 14 and its cup-shaped bottom 18.

A vertically reciprocal shaft 28 extends through the sleeve bearing 26. The shaft carries a generally conically shaped baffle 70 at its lower end, and a circular plate 32 disposed beneath the platform 22. A resilient and compressible circular gasket 33 on the lower surface of the baffle overlies the seat 20.

An arm 34 is pivotally mounted on a bracket 36 carried by the platform 22. The arm 34 is connected to the shaft 28 by a pin 38. A coiled spring 40 surrounds the pin 38 between the arm 34 and the upper surface of platform 22, and an inflatable bladder 42 is positioned between the bottom surface of the platform 22 and the plate 32.

The distal end of the arm 34 extends into a brewing chamber 44 designed to accept a single serve beverage filter cartridge 46 of the type for example described in co-pending patent application Ser. No. 09/782,622 filed Feb. 13, 2001, the description of which is herein incorporated by reference in its entirety.

An air pump 48 on the platform 22 is pneumatically connected to the bladder 42, and is also connected via a flexible hose 50 to a port 52 in the baffle 70. A metering tube 54 extends through the baffle 70 into the chamber 16. The metering tube 54 is connected via a second flexible hose 56 to a depending tubular probe 58 carried by the arm 34. A second tubular probe 60 underlies the cartridge 46 and opens downwardly above an exterior shelf 62 configured and dimensioned to support a cup 64 or other like receptacle.

The tank 14 stores a supply of liquid 66 heated by an electrical heating element 68 underlying the cup-shaped bottom 18.

Figure 2A:
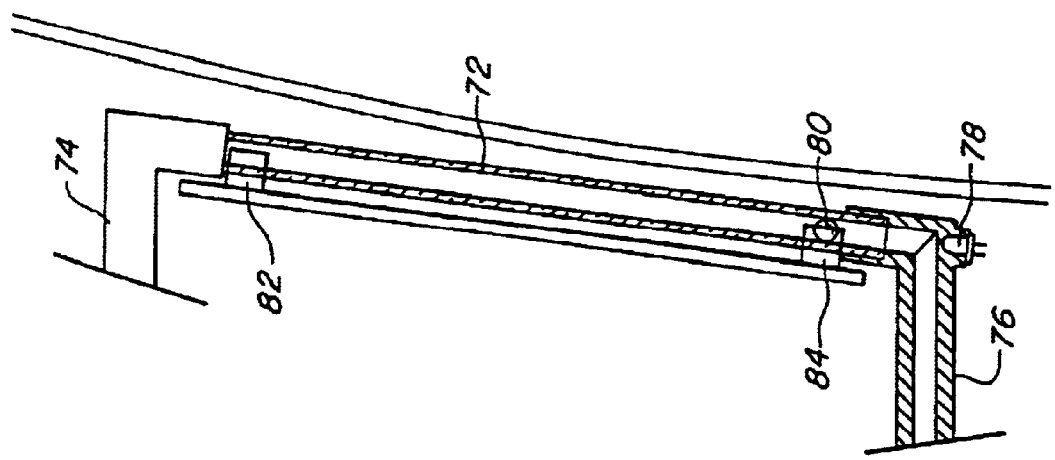
FIGS. 2A–2C are enlarged views showing the illuminated liquid level indicator.
Figure 2B:
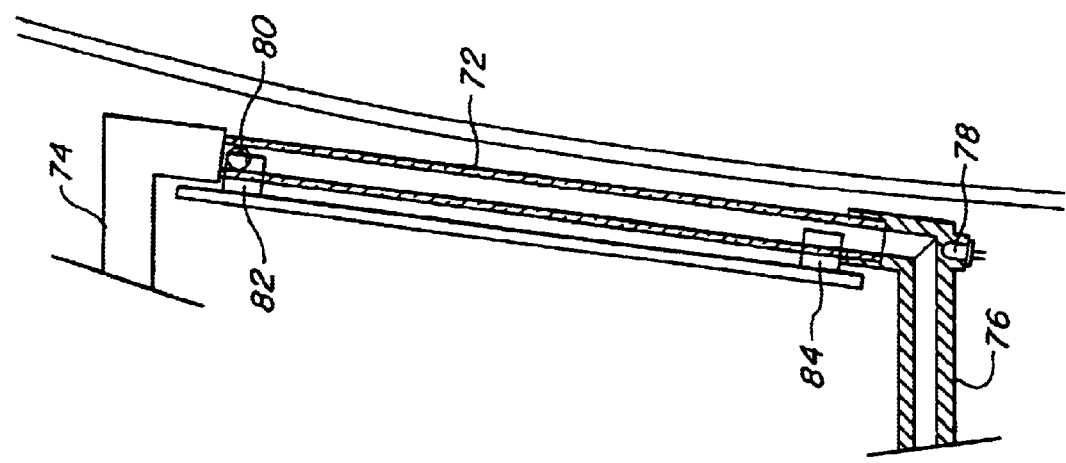
Figure 2C:
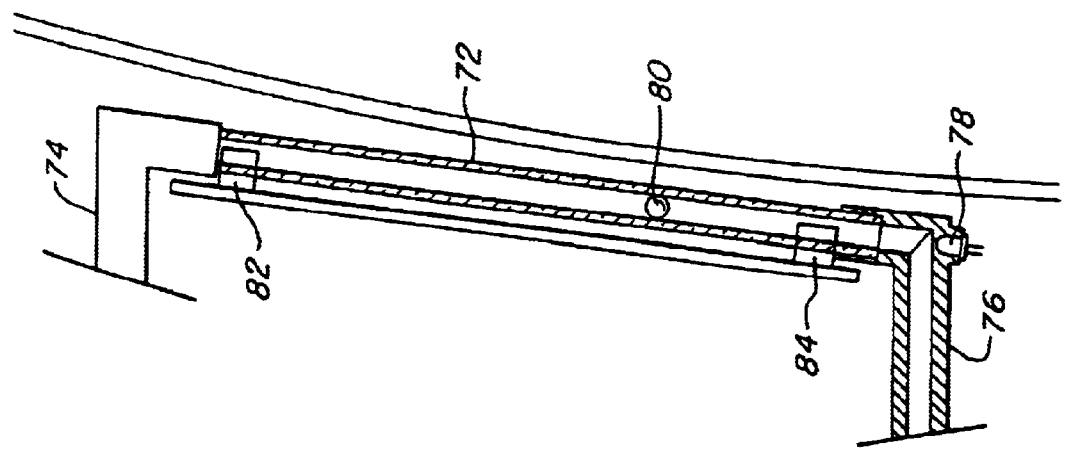

A tubular transparent column 72 is connected by upper and lower branch conduits 74 and 76 to the tank 14. As can best be seen by further reference to FIGS. 2A–2C, the column is illuminated from below by a blue light source 78, such as a light emitting diode (LED). The column 72 contains liquid at the same level as the liquid level in tank 14. A ball 80 is buoyantly supported on the surface of the liquid contained in column 72, and its position in the column is visually enhanced by light emitted from the underlying light source 78. Optical sensors 82, 84 are positioned to sense the position of the ball in its uppermost and lowermost positions, as shown in FIGS. 2B and 2C. The uppermost position provides an indication that the tank 14 is filled, and the lowermost position conversely indicates that the tank has been emptied and is in need of being refilled.

Figure 3:
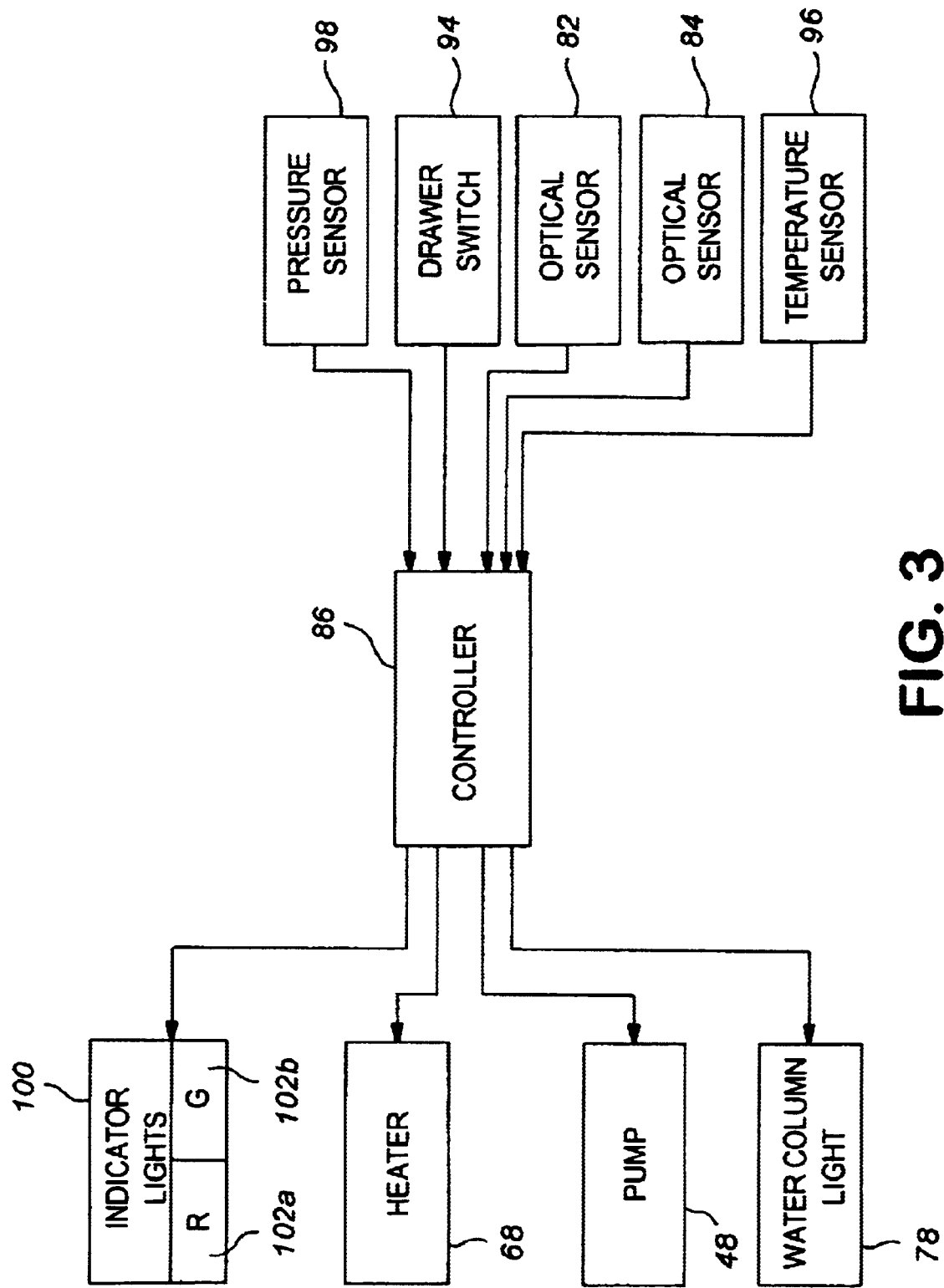
FIG. 3 is a control schematic.

With reference to FIG. 3, it will be seen that the sensors 82, 84 provide output signals to a controller 86.

Referring again to FIG. 1, the brew chamber 44 includes a drawer 88 that may be opened to the position indicated by the broken lines in FIG. 1 in order to accept the filter cartridge 46. The drawer 88 is carried on a slide bar 90 guided by rollers 92, and a switch 94 provides a control signal to the controller 86 (FIG. 3) indicating open and closed drawer positions.

A temperature sensor 96 provides a signal to the controller 86 (FIG. 3) indicative of liquid temperature in the metering chamber 16, and a pressure sensor 98 provides a signal to the controller indicative of air pressure in the hose 50, which is representative of the air pressure in the metering chamber 16.

Referring again to FIG. 3, a panel 100 on the brewer head includes red and green indicator lights 102a, 102b, connected to the controller 86. The heater 68 and pump 48 are also connected to the controller 86.

Figure 4:
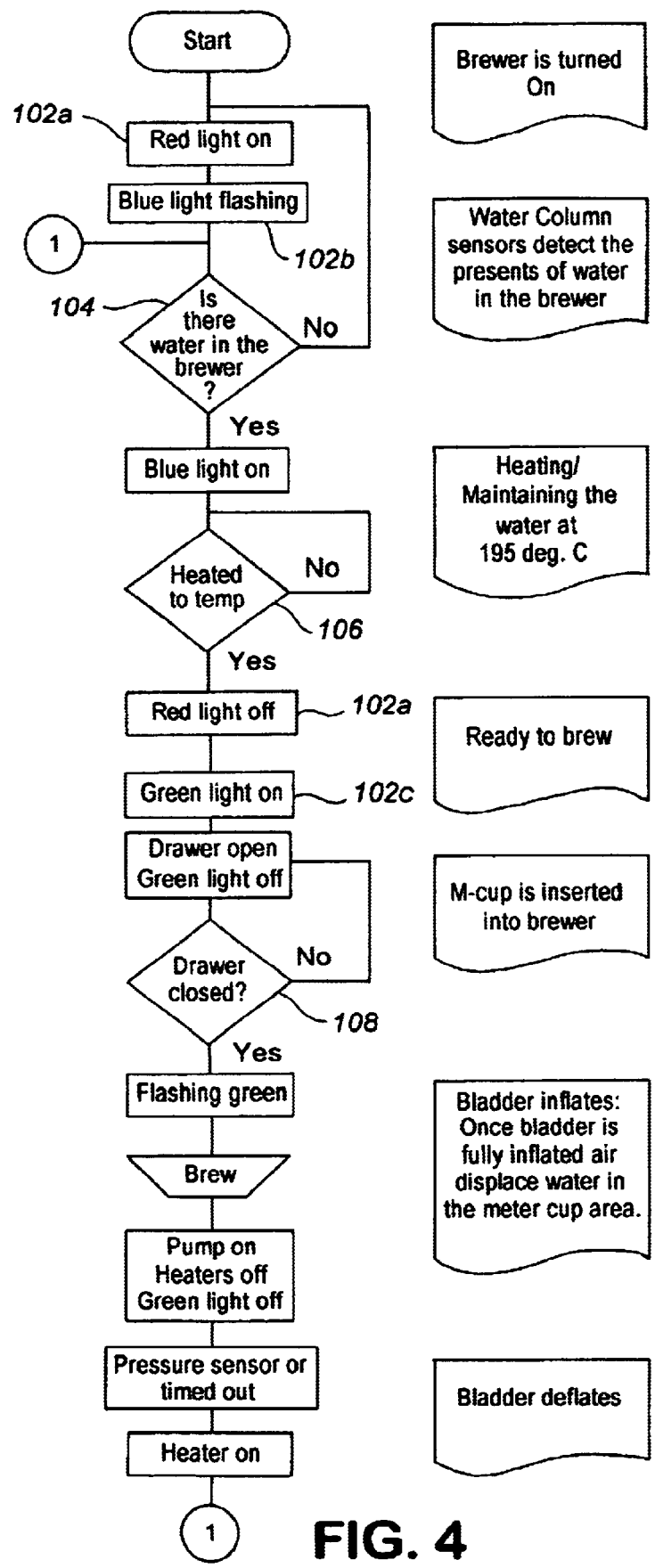
FIG. 4 is a flow chart generally depicting the sequential steps in a brew cycle.

With reference additionally to FIG. 4, it will be seen that when the brewer is initially energized, the red light 102a is lit continuously and the blue light 78 is in a flashing mode. The sensors 82, 84 provide the controller 86 with an indication of the liquid level in the tank 14, and the controller performs a test 104 to determine if an adequate liquid supply is available. A "No" determination recycles the sequence, and a "Yes" determination illuminates the blue light 78 continuously. The controller 86 then performs a second test 106 using the signal from the temperature sensor 96 to determine if the liquid in the metering chamber 16 has been heated to the desired brew temperature. A "No" determination recycles the sequence, and a "Yes" determination extinguishes the red light 102a and illuminates the green light 102b, indicating that the brewer is ready to perform a brew cycle.

The user then opens the drawer 88 and inserts a filter cartridge 46. The switch 94 provides the controller with a signal indicating that the drawer is open, in response to which the controller extinguishes the green light 102b. The controller then performs a test 108 to determine if the drawer had been closed. A "No" determination recycles the sequence, and a "Yes" determination causes the controller to intermittently illuminate the green light 102b, and to commence the brew cycle by energizing pump 48 and deenergizing the heater 68.

The air pump 48 then pneumatically effects the following sequence of system operation. The bladder 42 is inflated, the pushing shaft 28 and the baffle 70 downwardly, until the gasket 33 is pressed against the seat 20 to seal off the liquid in the metering chamber 16 from the remainder of the tank 14. The downward movement of the shaft 28 also produces downward pivotal movement of the arm 34 against the resistance of the spring 40, which in turn results in the lid and bottom of the cartridge 46 in the brewing chamber 44 being pierced respectively by probes 58, 60.

Compressed air is then fed into the metering chamber 16 via the hose 50, causing a metered mount of liquid to be expelled and fed to the cartridge 46 via the hose 56 and the tubular probe 58. The resulting brewed beverage exits the cartridge probe 60 and is received in the underlying cup 64.

At the conclusion of the brew cycle, compressed air purges the metering chamber 16, and the resulting pressure drop is sensed by the pressure sensor 98. The controller then responds by deactivating the pump 46 and the system is vented. The bladder 42 then collapses, allowing an upward displacement of the shaft 28 under the return force of the spring 40. The baffle 70 is thus raised above the seat 20, allowing air in the chamber 16 to be displaced by liquid in the tank 14. The return force of the spring 40 also pivots arm 34 upwardly, which in turn removes the probe 58 from the cartridge 46.

The drawer 88 may then be opened and the spent cartridge 46 removed from the brewing chamber, readying the system for the next cycle. The heater 68 is reenergized to heat the liquid that has refilled the metering chamber 16.

Various modifications may be made to the embodiment herein disclosed. For example, the shaft 28 may be vertically reciprocated by other means such as for example a motor-driven gear drive, or manual operation of the arm 34. The metering chamber 16 and the seat 20 may be formed on a separate cup-shaped insert received in the tank, rather than being formed integrally with the tank. The operation of pump 48 may be controlled by a timed sequence rather than in response to pressure in the metering chamber. Different visual indicators may be employed, and audible warning devices may be included to indicate various conditions, e.g., if the tank is either empty or in danger of being overfilled. An immersion heater may be employed in place of the external heating element 68.

Figure 5:
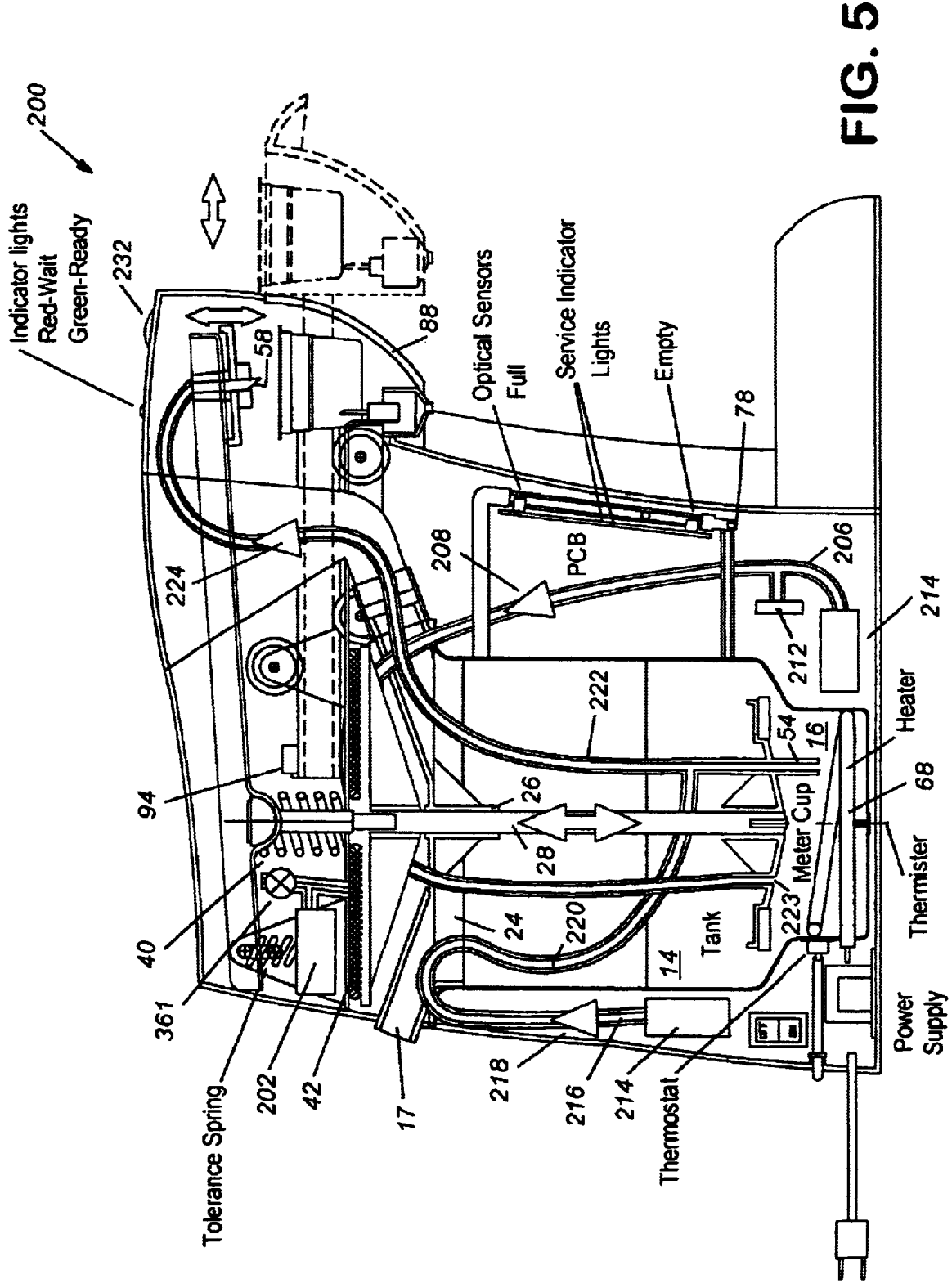
FIG. 5 is a vertical sectional view taken through an alternative embodiment single serve beverage brewer.

FIG. 5 is a vertical sectional view taken through an alternative embodiment single serve beverage brewer 200. This brewer 200 is substantially similar to the brewer 10 illustrated in FIG. 1, with the principal exception that the brewer 200 includes several pneumatic pumps to control the brewing process. Specifically, the brewer 200 includes an air pump 202 that inflates the air bladder 42. A first pneumatic brew pump 204 provides compressed air into conduit 206, which routes the compressed air through a check valve 208, and into the pneumatic port 52. A pressure sensor 212 is connected to the conduit 206. The pressure sensor 212 is preferably a dual threshold pressure sensor that provides a first signal on a line 214 indicative of when the pressure is above or below and first pressure threshold value (e.g., 1.5 psi), and a second signal on a line 215 indicative of when the pressure is above or below a second pressure threshold value (e.g., 7 psi). Such pressure sensors are available for example from World Magnetics (www.worldmagnetics.com) and from Micropneumatics Logic. The brewer 200 also includes an interrupt brew pump 214 that provides compressed air into conduit 216, which routes the compressed air through a check valve 218, and into conduit 220. The conduit 220 routes the compressed air from the interrupt brew pump to a flow line 222, which routes compressed air through a check valve 224 to the tubular probe 58.

Figure 6:
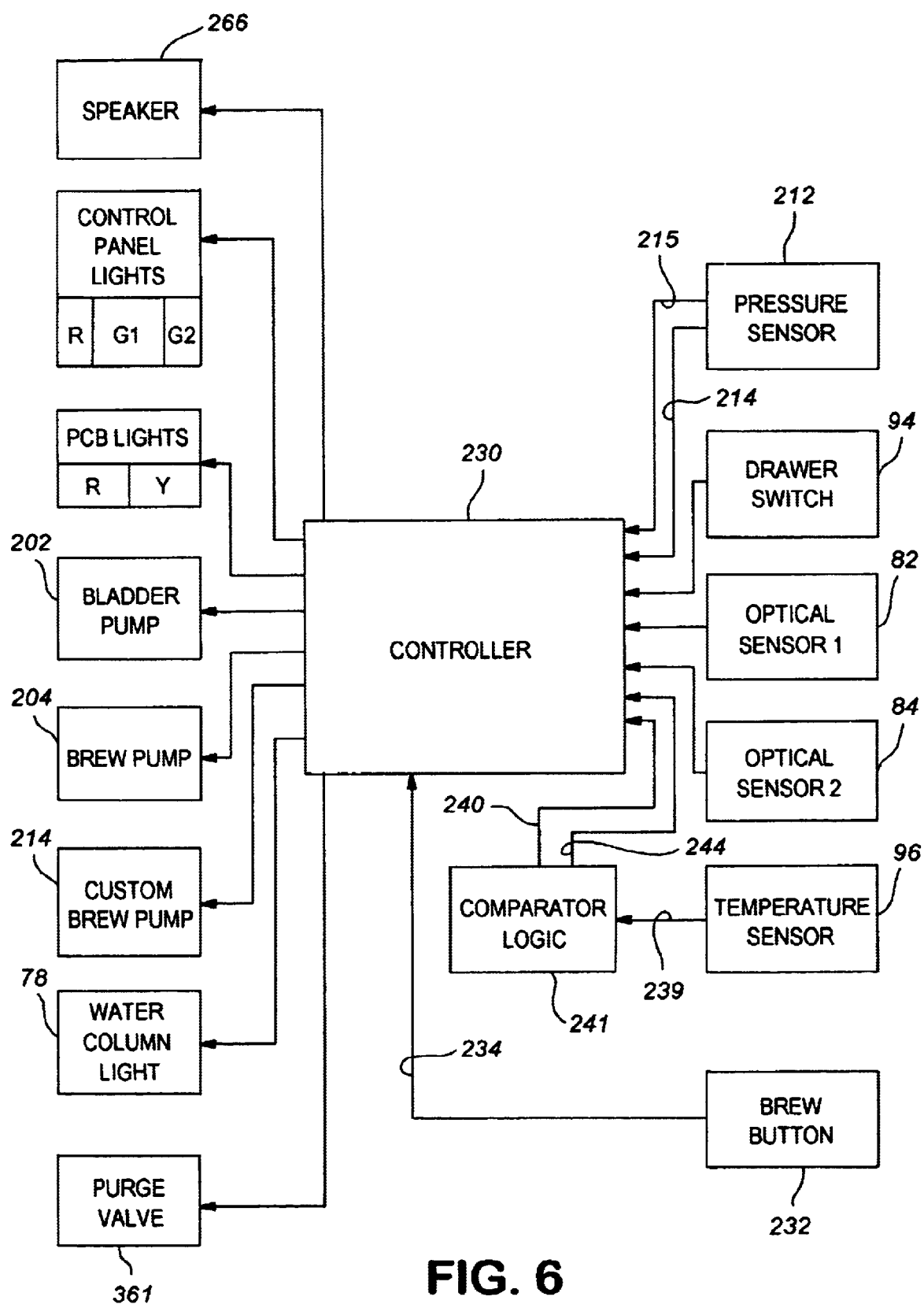
FIG. 6 is a block diagram illustration of the control system associated with the brewer illustrated in FIG. 5.

FIG. 6 is a block diagram illustration of the control system associated with the brewer illustrated in FIG. 5. A controller 230 (e.g., a microcontroller) receives Boolean signals from the pressure sensor 212, the drawer switch 94 and the optical sensors 82, 84. The controller also receives temperature threshold signals from a comparator circuit 241. The comparator circuit 241 receives a temperature signal on a line 239 from the temperature sensor 96. The circuit 241 includes a first comparator (not shown) that provides a Boolean signal on the line 240 indicative of whether or not the temperature is above or below a first temperature threshold value (e.g., 186° F.). The circuit 241 also includes a second comparator (not shown) that provides a Boolean signal on a line 244 indicative of whether or not the temperature is above or below a second temperature threshold value (e.g., 193° F.). The first and second temperature threshold values are used as set points for a heater control routine to be discussed hereinafter. The controller 230 also receives an input signal on a line 234 from a brew button 232 located on the brewer control panel. We shall now discuss the operation of the pumps 202, 204, 214 and a purge value 361.

Figure 7A:
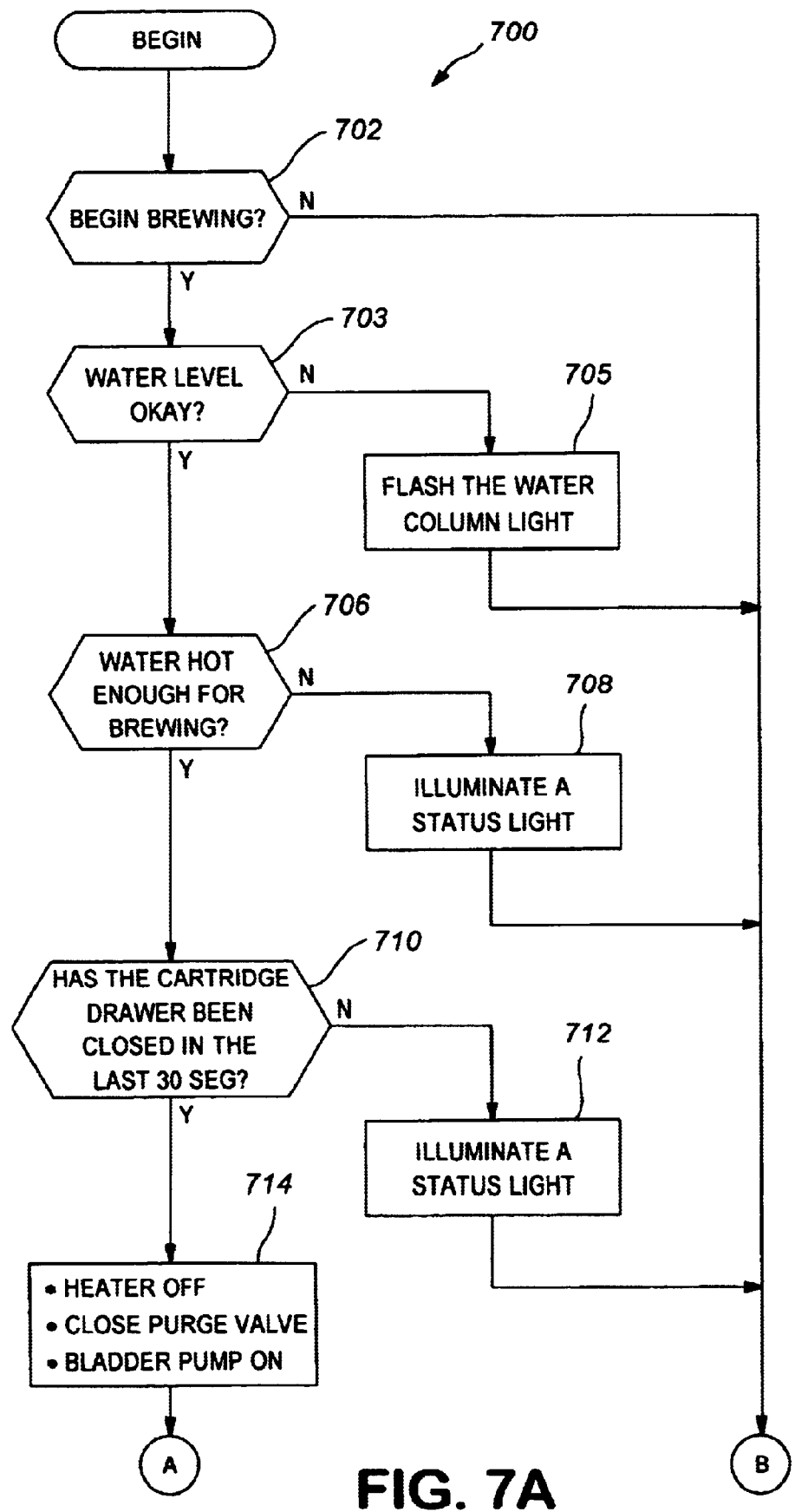
FIGS. 7A and 7B are flow charts that together illustrate steps performed by the controller of FIG. 6.
Figure 7B:
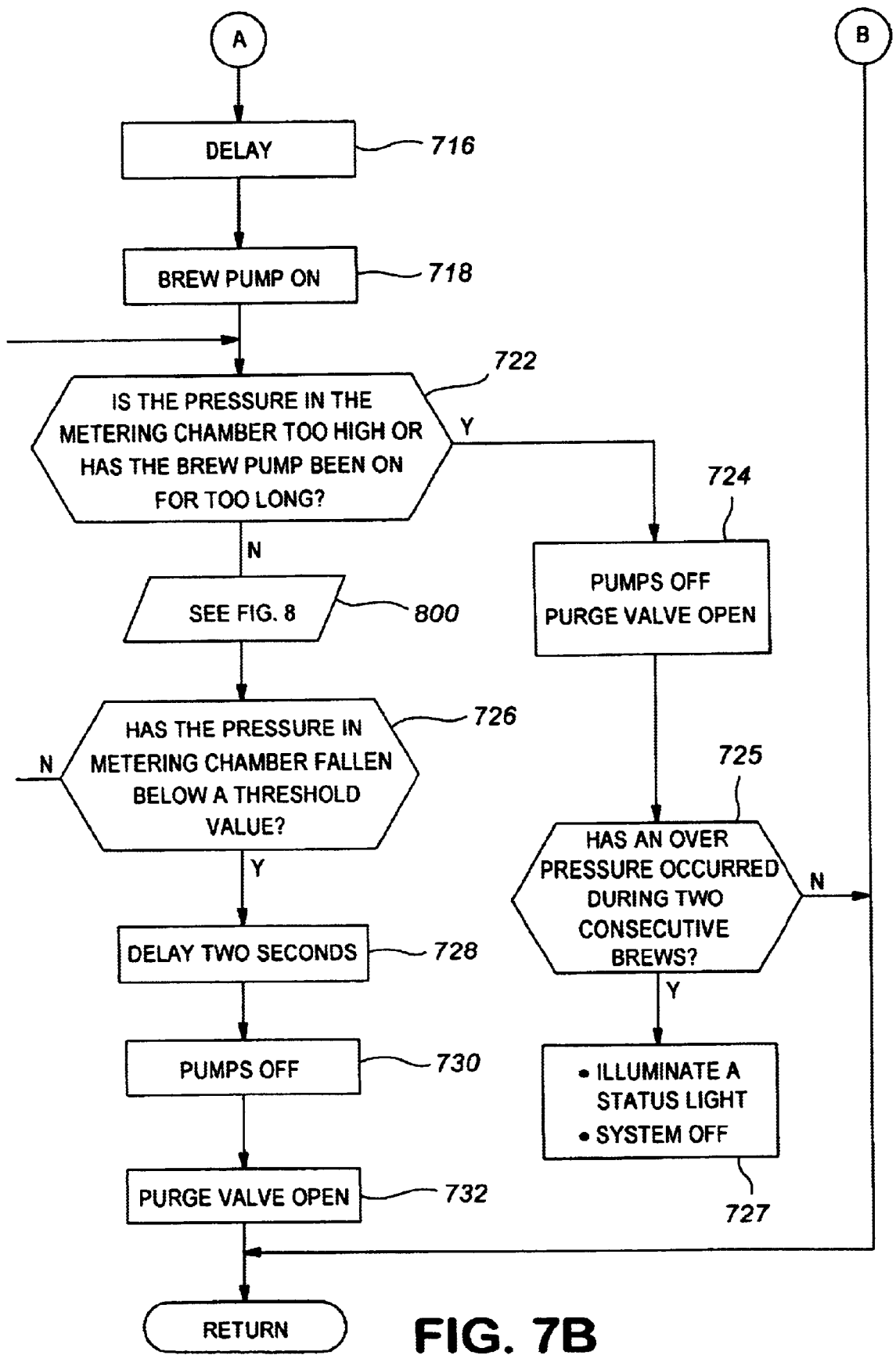

FIGS. 7A and 7B (collectively FIG. 7) together are a flow chart illustration of a brew cycle routine 700 performed by the controller 230. The controller 230 is preferably a microcontroller such as a model PIC16C57 manufactured by Microchip (www.microchip.com). This microcontroller includes on chip program memory, RAM and a CPU. In this embodiment, the steps illustrated in FIG. 7 represent executable program instructions that are stored in the microcontroller program memory and periodically executed by the CPU.

The routine 700 includes a test 702 that determines if the brewing process should begin. This test checks the state of the brew signal on the line 234 (FIG. 6) that is generated by a brew button located on the brewer, and depressed when the user wishes to brew a beverage. If the signal on line 234 indicates that a user has not depressed the brew button, then the remaining steps of the routine 700 are not executed. However, if the brew signal indicates that the user has depressed the brew button, test 703 checks the liquid level sensors 82, 84 (FIG. 6) to ensure that there is water in the brewer. If there is not, step 705 is performed to flash the water column light 78 (FIG. 6) to call attention to the tubular transparent column that indicates the water level. If there is enough water in the brewer, test 706 is performed to determine if the water temperature is hot enough for brewing. The test 706 checks the status of the Boolean signal on line 240 (FIG. 6) to determine if the water temperature is above the first threshold value. If the temperature is not above the first threshold value (e.g., the signal on the line 240 is a logical zero) then step 708 is executed to illuminate a status light (e.g., a yellow light) to indicate the water temperature is not hot enough for brewing. If the water temperature is hot enough for brewing, a test 710 is performed to check that the cartridge drawer 88 (FIG. 5) has been closed in the last thirty (30) seconds. This test helps to ensure that the user has placed an unused cartridge into the brewer. Specifically, the test 710 checks the status of the signal from the drawer switch sensor 94 (FIGS. 5 and 6). If the drawer 88 has not been closed in the last thirty seconds, step 712 is performed to illuminate a status light. If the drawer is closed, then the system is ready for brewing and step 714 is performed to turn the heater off, close the purge valve 361 (FIG. 6) and turn the bladder pump 202 (FIG. 6) on.

Referring to FIG. 5, turning the bladder pump 202 on causes the air bladder 42 to inflate, which moves the shaft 28 downward sealing the gasket 33 against the seat 20 to establish the metering chamber area 16. This also causes the arm 34 to pivot, causing the probe 58 to puncture the cartridge 46 to establish a flow path inlet to the cartridge. The downward force from the arm 34 also forces the cartridge against and to be pierced by the flow outlet needle 60, thus establishing a flow exit path from the cartridge. Referring to FIGS. 5 and 7, following the step 714 where the bladder pump is turned on, step 716 is performed to delay for several seconds (e.g., five seconds), before commanding the brew pump 204 (FIG. 5) on in step 718. The delay accounts for the time is takes for the shaft 28 to drive the gasket 33 into position to seal the metering chamber, and for the arm 34 to move into the brewing position.

While the brew pump 204 is on and the bladder 42 is inflated to seal the gasket 33 against the seat 20, compressed air enters the metering chamber 16 through port 223 driving water in the metering chamber into the metering tube 54. The water then passes through the brew valve check valve 224 into the cartridge 46. The water enters the cartridge through the downwardly projecting apertured probe 58, passes through beverage extract and a filter within the cartridge, and exits the cartridge through the hollow piercing member 60 to a cup below.

Referring again to FIGS. 5 and 7, once the brew pump 204 is turned on in the step 718, the controller performs a safety test 722. The test 722 monitors the sensed pressure signal value on the line 215 (FIG. 6), which is indicative of whether or not pressure in the metering chamber exceeds a maximum pressure threshold value (e.g., 7 psi). If the pressure the pressure exceeds the maximum pressure threshold value, then step 724 commands the pumps off. Step 724 also commands a purge valve 361 (FIG. 5) to the open, in order to deflate the air bladder 42 causing the shaft 28 to move vertically upward and the probe 58 to disengage from the cartridge 46. The test 722 also checks if the brew pump 204 has been on for an excessive amount of time and executes the step 724 if it has. Following step 724, step 725 is performed to determine if an over pressure has been detected for two consecutive brewing cycles. That is, test 725 determines if during the brewing of the last two cups, was an over pressure detected during each brew. If it was detected during two consecutive brews, then the flow path between the metering tube 54 and the probe 60 may be at least partially blocked. Therefore, step 727 is performed to illuminate a status light(s) indicative of a detected condition where the user should clean the flow path between and including the metering tube 54 and the probe 60.

Figure 8:
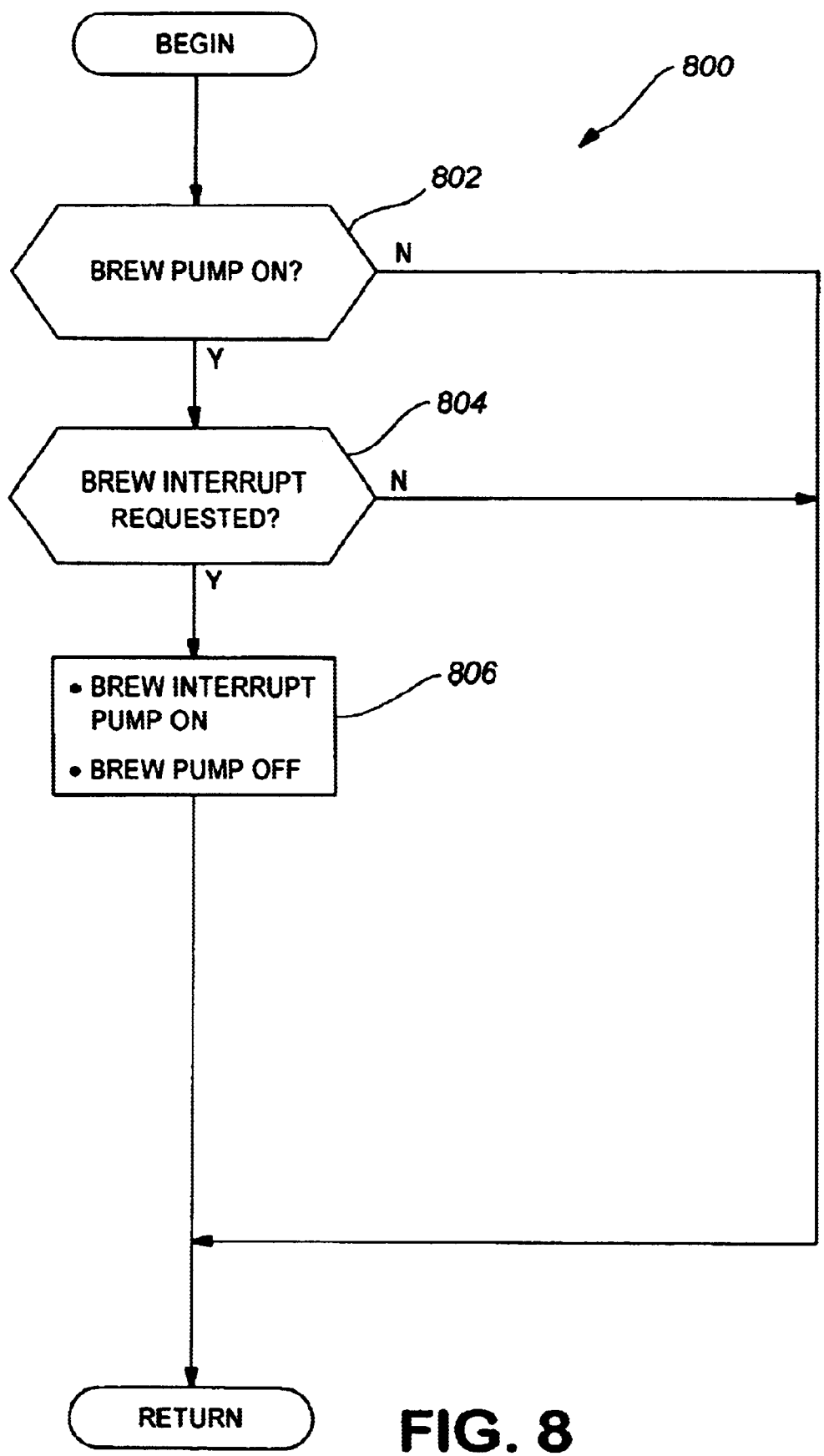
FIG. 8 is a flow chart illustration of steps performed by the controller of FIG. 6 to control a interrupt brew pump illustrated in FIG. 5.

If the test 724 determines an over pressure or a time-out situation does not exist, an interrupt brew routine illustrated in FIG. 8 is performed.

FIG. 8 is a flow chart illustration of a interrupt brew logic routine 800. This routine controls the operation of the interrupt brew pump 214 (FIG. 5), which provides a user the ability of customize the amount of water in their brewed beverage, and hence the taste. The routine includes a test 802 to check if the brew pump 204 (FIG. 5) is on. If the brew pump 204 is not on, then the routine exits. However, if the brew pump 204 is on, then a test 804 is performed to determine if the user has depressed the brew button 232 (FIG. 5). If the brew button is not depressed, the routine exits. If the user has depressed the brew button, then in step 806 the brew interrupt pump 214 (FIG. 5) is turned on, and the brew pump 204 (FIG. 5) is turned off. As a result, compressed air flows through the flow line 220 (FIG. 5), into the flow line 222 (FIG. 5) and through the tubular probe 58 (FIG. 5) into the cartridge. The brew interrupt pump remains on for about six seconds, to drive the water in the flow line 222 through the tubular probe 58 to the cartridge. Significantly, once the brew interrupt pump 214 is turned on, water no longer flows from the metering chamber 14 (FIG. 5) to the metering probe 54 (FIG. 5). Execution then returns to test 726 illustrated in FIG. 7.

Test 726 is performed to determine if the air pressure in the metering chamber 16 (FIG. 5) has dropped below a threshold value indicating that a desired amount of liquid has been output from the brewer. The threshold value is preferably a fraction of the nominal maximum sensed pressure during the brewing cycle. For example, the threshold may be 75% of the maximum sensed pressure during the brewing cycle. Alternatively, the threshold may be a constant value. If the user has not depressed the brew button while the brew pump is on in order to terminate the brew cycle, then the pressure will nominally drop below the threshold value when a predetermined amount of liquid has been delivered from the metering chamber. The predetermined amount (e.g., eight fluid ounces) is set based upon the size of the metering chamber. However, the user can control the amount of liquid in the brewed beverage by depressing the brew button while the brew pump is on. This causes the brew pump to turn off, and the brew interrupt pump to turn on in order to blow out the water in the line flow line 222. Significantly, depressing the brew button 232 (FIG. 5) while the brew pump is on, terminates the brew cycle causing an amount of liquid less than the predetermined amount to be delivered during the brew cycle.

The test 726 monitors the sensed pressure value on the line 214 from the pressure sensor 212 (FIG. 5). If the pressure has not dropped (i.e., the signal on the line 214 indicates the pressure is above the threshold), execution returns to test 322.

Once the test 726 determines that the pressure has dropped (caused by either delivering the predetermined amount of liquid or a brew interrupt), step 728 is performed to delay several seconds in order to blow residual liquid from the liquid flow path leading to the probe 58 (FIG. 5). During this delay the brew pump 204 or the interrupt brew pump 214 (FIG. 5) remains on, depending of course which one is on prior to the delay 228. Significantly, blowing out the flow path leading to the cartridge ensures that only hot water is used to brew, which is especially important if there is a substantial period between uses. In addition, blowing out the flow path removes liquid from the used cartridge for cleaner disposal. One of ordinary skill will recognize that during the delays the controller performs other tasks such as input signal processing, output signal processing, storage tank temperature control, and background and foreground built-in-tests, and/or other control and monitoring routines. The delays may be implemented by hardware or software counters.

Once the delay time of step 728 has elapsed, step 730 is executed to command the pumps 202, 204, 214 off. Step 732 is then performed to open the purge valve 361 (FIG. 5) to deflate the air bladder 42. Deflating the air bladder 42 causes the shaft 28 to move vertically upward, which allows water to enter (i.e., refill) the metering chamber 16 (FIG. 5) from the tank 14 (FIG. 5).

Referring again to FIG. 5, to brew another beverage, the drawer 44 is opened, the used cartridge is removed, a new cartridge is inserted and the drawer 44 is returned to the closed position, and the start brew button is depressed again.

Figure 9:
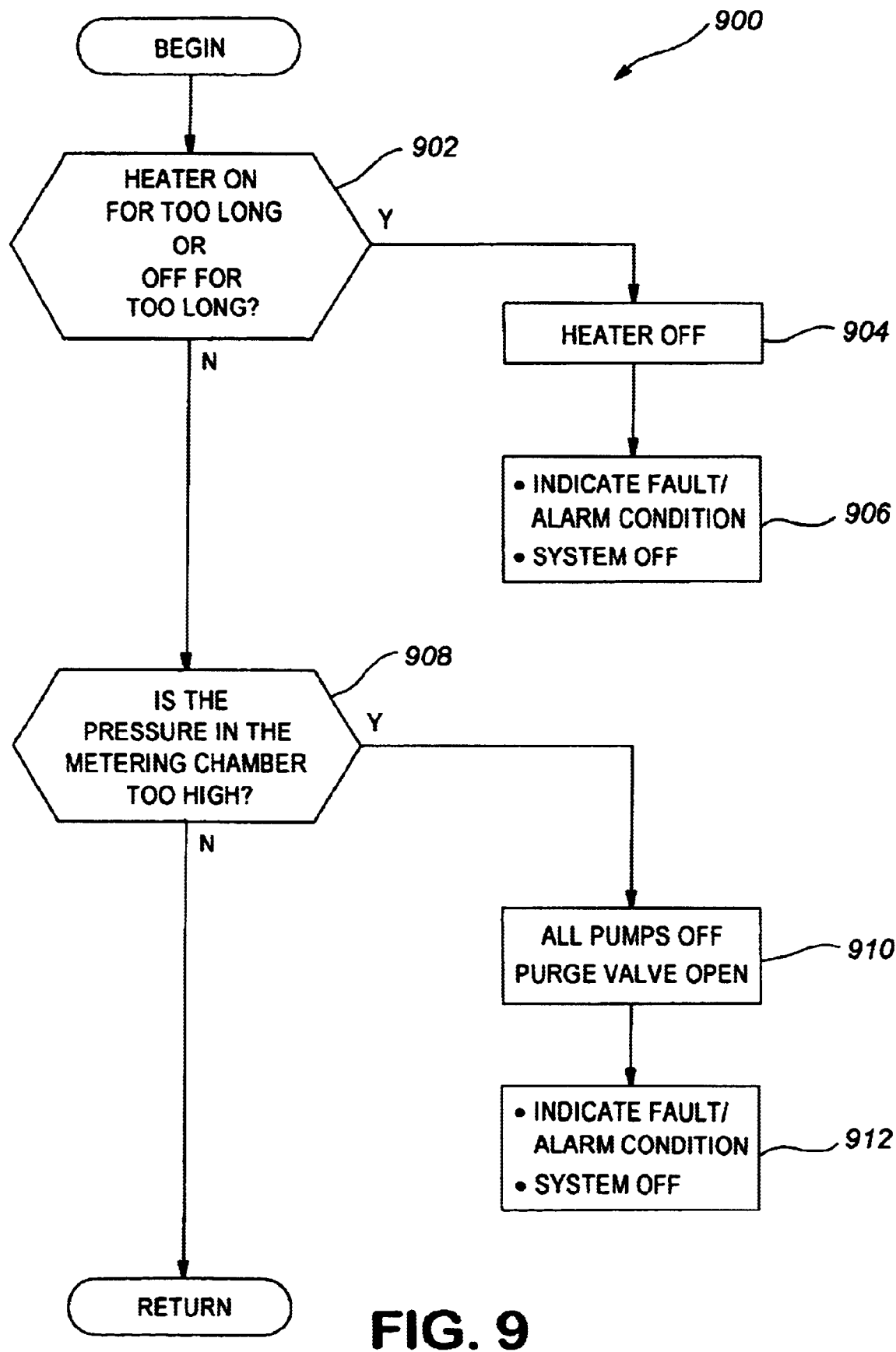
FIG. 9 is a flow chart illustration of a built-in-test (BIT) routine performed by the controller of FIG. 6 to detect faults in the brewer illustrated in FIG. 5.

FIG. 9 is a flow chart of a built-in-test routine 900 periodically performed by the controller. The routine 900 includes a test 902 to determine if the heater has been on for an excessive amount of time (e.g., twelve minutes), or it has been off for too long. If either of these conditions is true, step 904 commands the heater off. Step 904 may also command the pumps off, and the purge valve open. Step 906 then annunciates the fault/alarm condition and the system is placed into an "off/safety state" to prevent further brewing. Otherwise, test 908 is performed to determine if the metering chamber 14 (FIG. 5) is over pressurized. The test 908 reads the status of the signal on the line 215 (FIG. 5) from the pressure sensor (FIG. 5), and if the status of the signal indicates the pressure exceeds the second pressure threshold value associated with an over pressure, step 910 is performed to turn the pumps off and open the purge value. Step 912 is then performed to annunciate the fault/alarm condition and the system is placed into the "off/safety state" to prevent further brewing.

Figure 10:
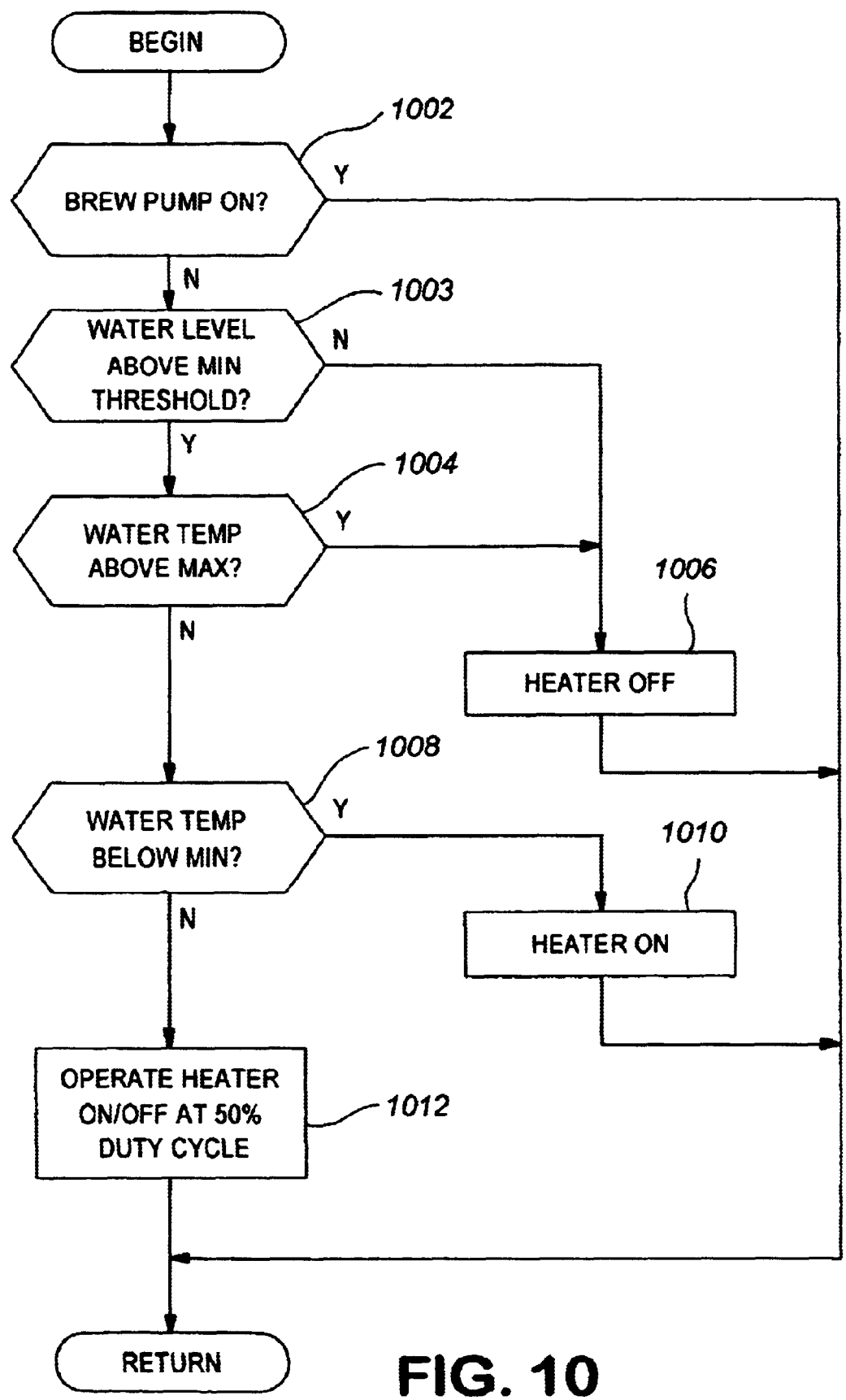
FIG. 10 is a flow chart illustration of a routine for controlling the liquid heater.

FIG. 10 is a flow chart illustration of a routine 1000 for controlling the liquid heater. The routine 1000 includes test 1002 that checks if the brew pump 204 (FIG. 5) is on. If it is, then the heater has already been commanded off (step 714 in FIG. 7), and heater remains off while the brew pump is on. However, if the brew pump is not on, then test 1003 checks to see if the water level in the brew is above the minimum threshold. This test is performed by checking the status of the signal from optical sensor #1 82 (FIGS. 2A and 5). If there is not enough water in the brewer the heater is turned off in step 1006. Otherwise, test 1004 is performed to determine if the water temperature is above a maximum water temperature threshold value. This test checks the status of the signal on the line 244 (FIG. 5). If the Boolean signal on the line 244 (FIG. 5) indicates that the temperature is greater than this threshold value, then the water is hot enough and the heater is commanded off in step 1006. Test 1008 is then performed to determine if the water temperature is below a minimum water temperature value. This test checks the status of the Boolean signal on the line 240 (FIG. 5). If the signal on the line 240 (FIG. 5) indicates that the temperature is less than the minimum water threshold value, then the heater is commanded on in step 1010. If the test 1008 determines the water temperature is not below the minimum water threshold value, then the temperature is between the minimum and maximum threshold temperature values (i.e., the threshold values set in the comparator circuit 241 of FIG. 5). Therefore, step 1012 is performed to turn the heater on and off with a 50% duty cycle.

Figure 11:
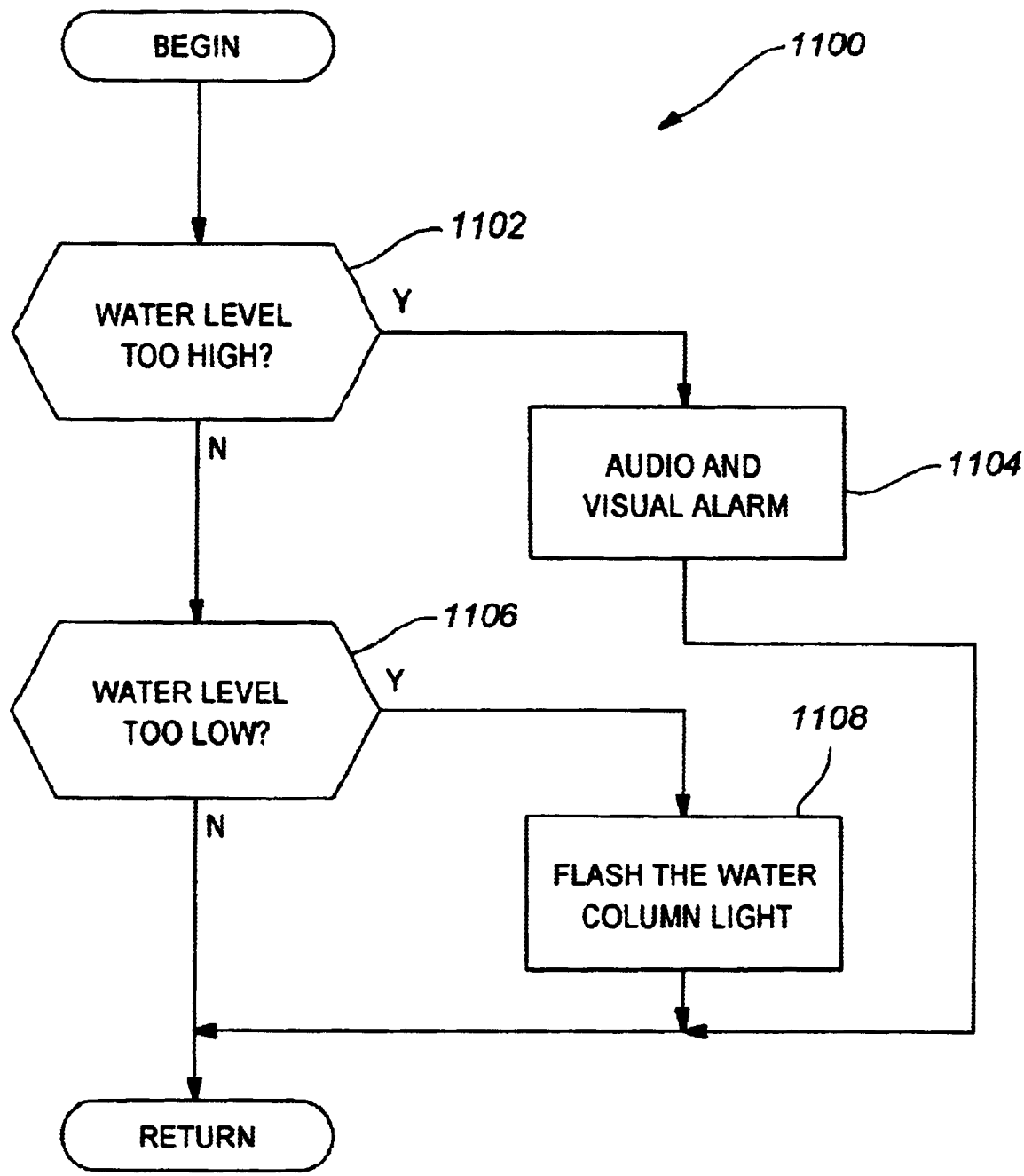
FIG. 11 is a flow chart illustration of a routine for monitoring the liquid level within the storage tank of the brewer illustrated in FIG. 5.

FIG. 11 is a flow chart illustration of a routine 1100 for checking the liquid level within the storage tank 14 (FIG. 5).

The routine 1100 includes test 1102 to check if the water level in the tank 14 (FIG. 5) is too high. The test checks the status of the optical sensor #1 (FIGS. 2A and 5). If the optical sensor #1 82 indicates the tank is full, then step 1104 is performed to provide an audio indication to the user to stop filling the unit via inlet 17 (FIG. 5). For example, several beeps may be output from speaker 266 (FIG. 5). If the tank is not full, then test 1106 is performed to determine if the water level is too low. If it is, then step 1108 is performed the flash the water column light 78 (FIGS. 2A and 5).

While the present invention has been described in the context of a preferred embodiment that senses air pressure to determine when the desired amount of liquid has been delivered from the metering chamber, the present invention is not so limited. For example, a level sensor (e.g., a float switch) may be located in the metering chamber to determine when the liquid in the chamber is below a certain level. In addition, the brew pump may be simply commanded on for a set period of time sufficient to ensure that the predetermined amount of liquid has been delivered from the metering chamber. Notably, it suffices that in all these embodiments of the present invention compressed air is used to drive liquid from the metering chamber. In addition, although the brewer is discussed in the context of manually adding water to the system, one of ordinary skill will recognize that the system may include automatic refill if connected for such operation to the plumbing.

Although the present invention has been discussed in the context of an automated brewing system that includes a microcontroller, one of ordinary skill will recognize that there a number of different techniques for controlling the delivery of the compressed air to the metering chamber. For example, a state machine may be used rather than a CPU. In addition, the controller may be an analog system rather than a digital controller. Furthermore, a pneumatic controller rather than an electronic controller may be used to control delivery and venting of the compressed air. While obvious, it should also be noted the present invention is certainly not limited to the delay values, threshold values or brewing sizes discussed herein. In addition, it is contemplated that rather than an electrically controllable valve, the purge valve may be mechanically linked to the arm so the valve opens as the arm moves from the beverage brewing position. In addition, the controller may also include an analog-to-digital converter (ADC), which allows analog temperature and pressure signal values to be input to the controller and digitized for use in the control and monitoring routines.

The present invention may also operate in a "vending" environment. That is, as a vending machining, the system would not start brewing until money has been deposited or an account debited. For example, test may check to ensure the required fee has been paid before brewing is allowed to start.

Although the present invention has been shown and described with respect to several preferred embodiments thereof, various changes, omissions and additions to the form and detail thereof, may be made therein, without departing from the spirit and scope of the invention.

What is claimed is:

1. A brewing system for brewing a beverage from an extract contained in a sealed disposable cartridge, said system comprising:
   housing means defining a brewing chamber for receiving the cartridge;
   means associated with said housing means for piercing the cartridge to provide a first inlet and a first outlet communicating with the interior of the cartridge;
   a storage tank comprising a supply of liquid and having a reduced diameter cup-shaped bottom and being in communication with the cartridge via a second outlet;
   means for sealing a portion of said storage tank from the remainder of said storage tank to form a metering chamber, that includes said reduced diameter cup shaped bottom;
   means for delivering compressed air to said metering chamber to transfer a volume of liquid from said metering chamber via said second outlet for delivery to and through the cartridge via said first inlet and said first outlet, and for sensing the pressure of said compressed air and providing a sensed pressure signal value indicative thereof; and
   a controller that (i) commands said means for delivering to provide compressed air to said metering chamber, (ii) monitors said sensed pressure signal value and (iii) commands said means for delivering to terminate delivery of compressed air to said metering chamber after detecting that said sensed pressure signal value has dropped below a threshold value, and unseals said metering chamber.

2. The brewing system of claim 1, wherein said means for delivering comprises:
   a first brew pump for generating said compressed air;
   a flow line that receives and provides said compressed air to said metering chamber; and
   a pressure sensor disposed to sense the pressure of said compressed air within said flow line and provide said sensed pressure signal value.

3. The brewing system of claim 2 wherein said controller commands off said means for delivering to terminate delivery of said compressed air a predetermined time after detecting that said sensed pressure signal value has dropped below a threshold value.

4. The brewing system of claim 3, wherein said means for sealing comprises:
   a slideable shaft having a proximal end and a distal end that includes a sealing assembly on said distal end, wherein said sealing assembly moves between a first position and a second position, wherein in said second position said sealing assembly engages a seat of said cup shaped bottom to form said metering chamber; and
   means for moving said slideable shaft between said first and second positions.

5. The brewing system of claim 2, wherein said means for delivering includes a second air pump that delivers a second flow of compressed air downstream of said second outlet ump in response to a brew interrupt signal received by said controller.

6. The brewing system of claim 4, wherein said means for moving said slideable shaft between said first and second positions comprises:
   an air bladder pump that receives an air bladder pump command signal from said controller and provides compressed air;
   an air bladder that receives said compressed air from said air bladder pump, and in an inflated state drives said shaft to said second position, and in an uninflated state drives said shaft to said first position; and
   a valve that is operably connected to said air bladder and can be opened and closed in response to a valve command signal from said controller, wherein in the open position said
   valve vents said air bladder to ambient and in the closed position prevents said air bladder from venting to ambient.

7. The brewing system of claim 4, wherein said means for moving said slideable shaft between said first and second positions comprises:

an air bladder pump that receives an air bladder pump command signal from said controller and provides compressed air to (i) said means for moving said slideable shaft and to (ii) said means for delivering compressed air; and an air bladder that receives said compressed air from said air bladder pump, and in an inflated state drives said shaft to said second position, and in an uninflated state drives said shaft to said first position.

8. A system for repeatedly delivering a volume of heated liquid, said system comprising:

a storage tank comprising a supply of liquid and having a reduced diameter cup-shaped bottom and a sidewall with a seat;

a heater for heating the supply of liquid;

a slideable shaft having a proximal end and a distal end that includes a sealing assembly on said distal end, wherein said shaft assembly is connected to a baffle that moves between a first position and a second position, wherein in said second position said baffle engages said seat to form a metering chamber in a portion of said storage tank; and means for moving said slideable shaft between said first and second positions;

a discharge conduit communicating with the interior of said metering chamber; and a first pump that pneumatically pressurizes the interior of said metering chamber to an elevated pressure level to exhaust said heated liquid from said metering chamber via said discharge conduit.

9. The system of claim 8, further comprising:

a sensor that senses pressure in said metering chamber and provides a sensed pressure signal value indicative thereof; and a controller that monitors said sensed pressure signal value and turns said first pump off a predetermined time period after detecting a reduction in said sensed pressure signal value below a threshold value indicating said volume of heated liquid has been delivered through said discharge conduit.

10. The system of claim 9, wherein said controller comprises a central processing unit.

11. The system of claim 10, further comprising:

a holder that holds and pierces a disposable cartridge containing a beverage extract to establish a cartridge inlet and a cartridge outlet that together define a flow path through the beverage extract to provide a brewed beverage through said cartridge outlet, wherein said cartridge inlet receives said heated fluid.

12. The system of claim 11, further comprising:

a temperature sensor that senses the temperature of said supply of liquid in said storage tank and provides a sensed temperature signal value indicative thereof, wherein said controller monitors said sensed temperature signal value and prevents said first pump from being turned on if said temperature signal is below a minimum brewing temperature value.

13. The system of claim 12, wherein said controller monitors said temperature signal value and commands said heater on if said sensed temperature signal value drops below a lower heating threshold value and commands said heater off if said sensed temperature signal value is greater than an upper heating threshold value.

14. The system of claim 8, wherein said means for moving said slideable shaft comprises an air bladder that receives compressed air from said first pump to move said slideable shaft between said first and second positions.

15. The system of claim 8, wherein said means for moving said slideable shaft comprises an air bladder that receives compressed air from a second pump to move said slideable shaft between said first and second positions.

16. The system of claim 9, wherein said means for moving said slideable shaft comprises:

a second pump that receives a second pump command signal from said controller and provides compressed air;

an air bladder that receives said compressed air from said second pump, and in an inflated state drives said shaft to said second position, and in an uninflated state drives said shaft to said first position; and a valve that is operably connected to said air bladder and can be opened and closed in response to a valve command signal from said controller, wherein in the open position said valve vents said air bladder to ambient and in the closed position prevents said air bladder from venting to ambient.

17. The brewing system of claim 16, further comprising a third air pump that delivers a third flow of compressed air to said flow line upstream of said first pump in response to a brew interrupt signal received by said controller.

18. An automated beverage brewing system that receives a cartridge containing a beverage extract and establishes a liquid flow path through the cartridge to provide a brewed beverage, said system comprising:

a holder that holds and pierces the cartridge to provide a cartridge inlet and a cartridge outlet that together establish a flow path through the beverage extract to provide the brewed beverage;

a storage tank comprising a supply of liquid and having a reduced diameter cup-shaped bottom and being in communication with the cartridge via a chamber outlet port;

means for sealing a portion of said storage tank to form a metering chamber in cooperation with said reduced diameter cup-shaped bottom;

a first pump that provides compressed air along a flow line to said metering chamber to force liquid from said metering chamber and through said chamber outlet port;

a sensor that senses air pressure in said flow line and provides a sensed pressure signal indicative thereof; and a controller that commands said first pump on, monitors said sensed pressure signal and turns said first pump off after detecting that said sensed pressure signal value has dropped below a threshold value indicating the predetermined volume of liquid has been delivered through said chamber outlet port.

19. The brewing system of claim 18, wherein said controller also commands said pump off if said sensed pressure signal value exceeds an upper pressure threshold value.

20. The brewing system of claim 19, further comprising:

a temperature sensor that senses the temperature of the liquid in said storage tank and provides a sensed temperature signal value indicative thereof, wherein said controller monitors said sensed temperature signal value and will not command said pump on if said sensed temperature signal value is below a temperature threshold value.

21. The brewing system of claim 18, further comprising a second air pump that delivers a second flow of compressed air downstream of said metering chamber outlet port and upstream of said cartridge inlet in response to a brew interrupt signal received by said controller.

* * * * *